April 2, 1929.       S. M. FAIRCHILD       1,707,849
CAMERA SHUTTER
Filed April 13, 1927       6 Sheets-Sheet 1
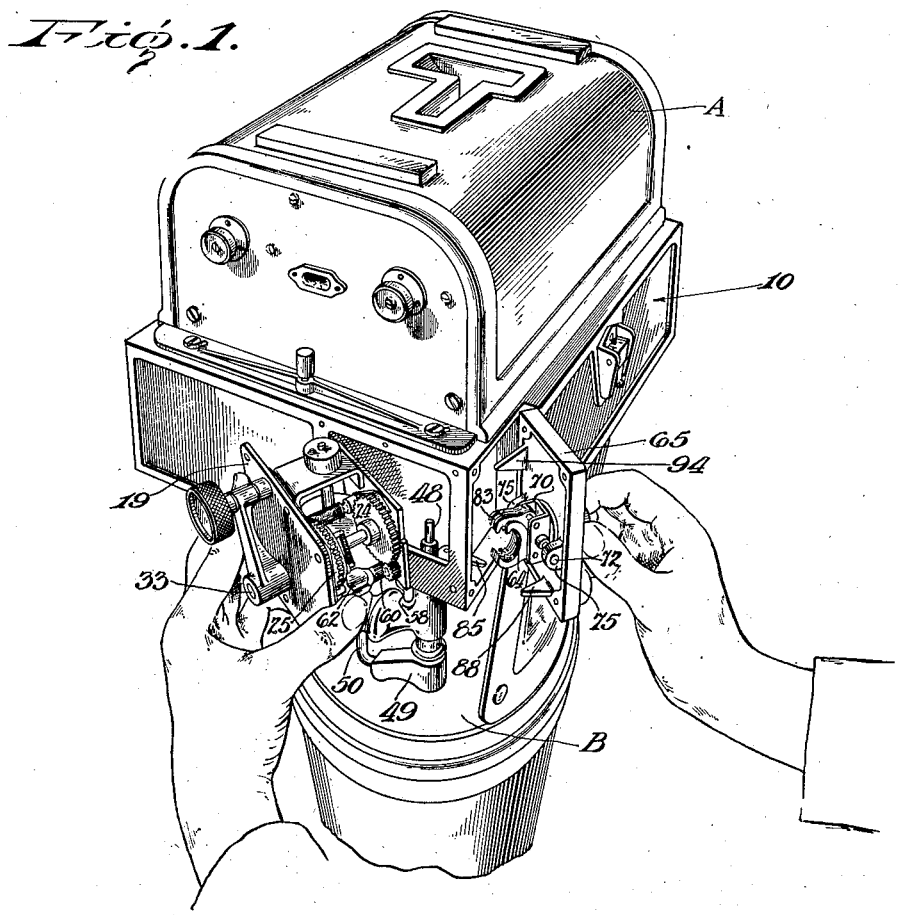
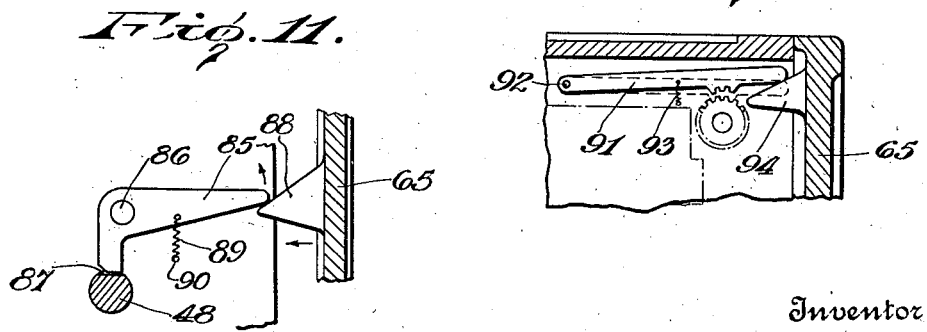
Inventor
SHERMAN M FAIRCHILD
By   Attorney
       B. H. Carpenter April 2, 1929.  S. M. FAIRCHILD  1,707,849
CAMERA SHUTTER
Filed April 13, 1927   6 Sheets-Sheet 2

Inventor
SHERMAN M FAIRCHILD
By Attorney
B. H. Carpenter

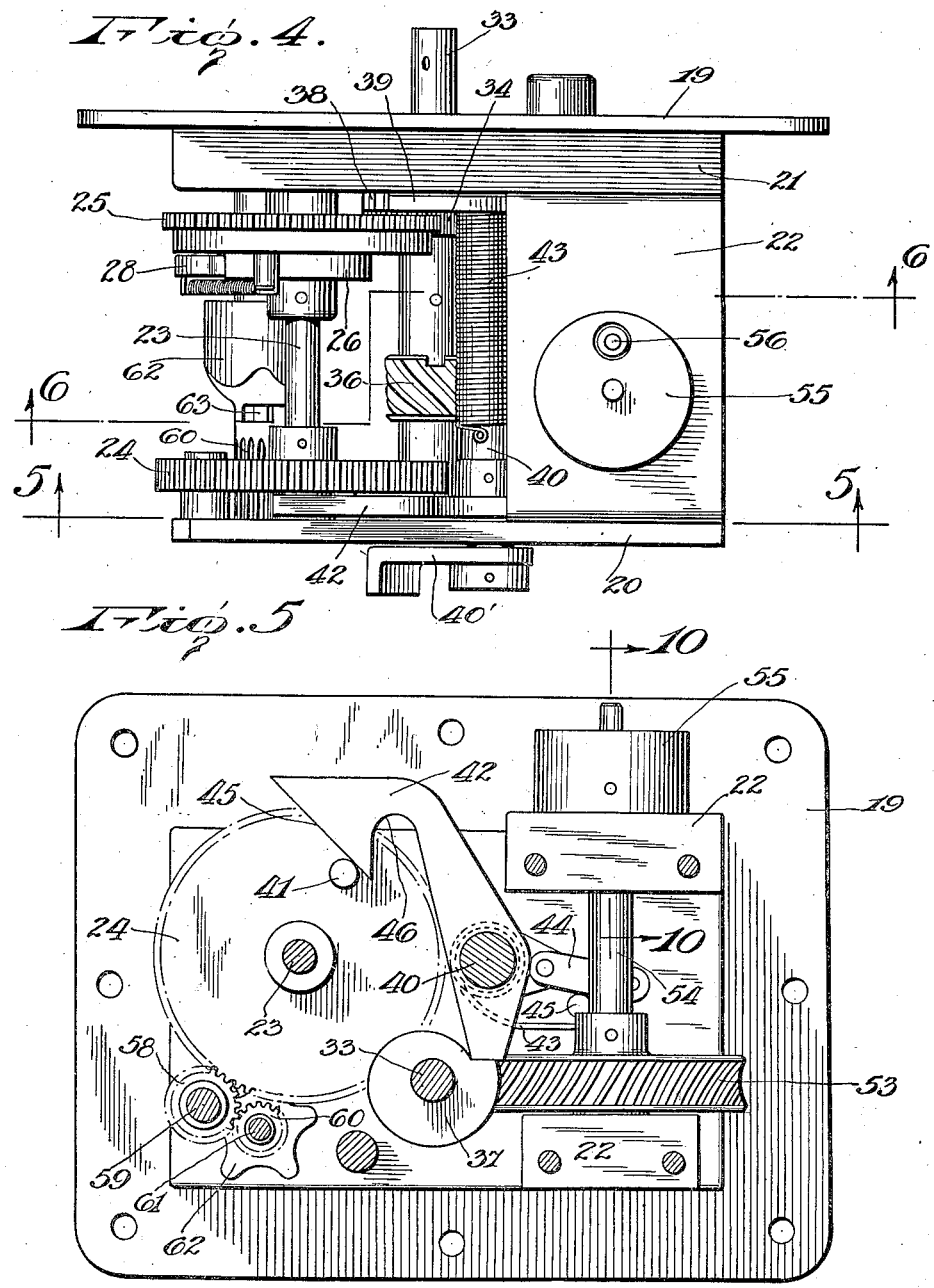

April 2, 1929.  S. M. FAIRCHILD  1,707,849
CAMERA SHUTTER
Filed April 13, 1927  6 Sheets-Sheet 4

Inventor
SHERMAN M FAIRCHILD
By Attorney
B H Carpenter

April 2, 1929.  S. M. FAIRCHILD  1,707,849
CAMERA SHUTTER
Filed April 13, 1927   6 Sheets-Sheet 5
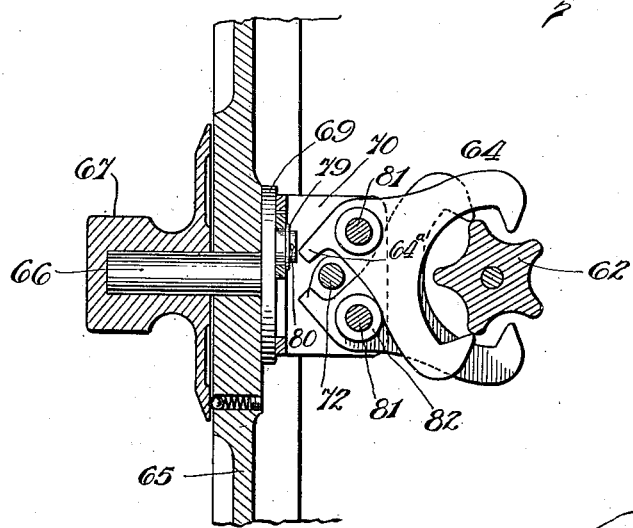
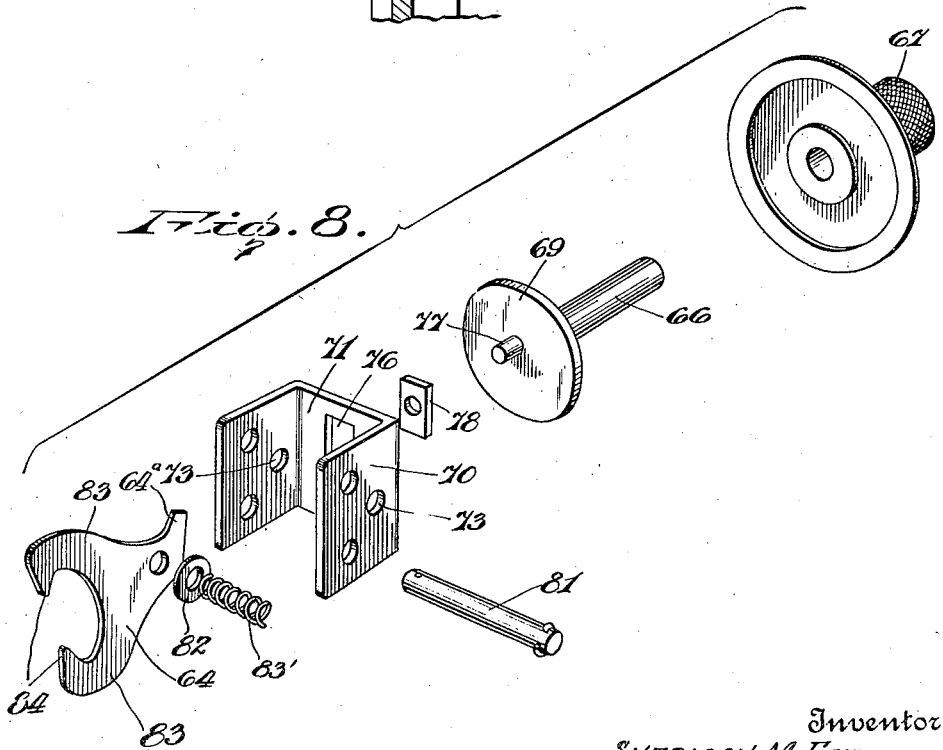
Inventor
SHERMAN M. FAIRCHILD
By Attorney
B H Carpenter April 2, 1929.   S. M. FAIRCHILD   1,707,849
CAMERA SHUTTER
Filed April 13, 1927   6 Sheets-Sheet 6

Inventor
SHERMAN M FAIRCHILD
By   Attorney
B. H. Carpenter

Patented Apr. 2, 1929.

1,707,849

UNITED STATES PATENT OFFICE.

SHERMAN MILLS FAIRCHILD, OF NEW YORK, N. Y.

CAMERA SHUTTER.

Application filed April 13, 1927. Serial No. 183,416.

This invention relates to improvements in camera shutters of the focal-plane type.

In my shutter I have obviated the necessity of various spring tensions and different width apertures in the shutter apron to obtain exposures of different duration and employ but a single aperture in the shutter apron and only one tension or speed in the shutter driving device. I obtain different durations of exposure by a simple braking device acting on the shutter driving device, the length of exposure being dependent upon the adjustment of the braking device. This braking device also serves as a uniform speed regulator for the shutter driving device holding the same to a constant speed throughout the exposure.

The main object of this invention is therefore to provide an improved and simplified focal-plane camera shutter in which the shutter travels at a uniform speed throughout an exposure. I obtain this result by providing a braking means for the shutter apron driving device.

A further object of this invention is to provide means for assisting the unwinding of the shutter apron from the storage spool as it is wound on the takeup spool during an exposure.

Another object is to provide an interlock between the plate carrying the braking means of the shutter driving device and the shutter releasing trigger which will prevent the operation of the trigger except when the plate carrying the braking means is in place. This feature obviated the danger of releasing the shutter with the driving means therefore in an unrestrained condition.

Another object is to provide a combined uniform speed regulator and duration of exposure regulator.

Other objects will appear from the following description and appended claims.

I attain the above objects by means, preferred forms of which are illustrated in the accompanying drawings, in which:

Fig. 1 is a perspective view of an aerial camera embodying my invention with parts disconnected to more clearly show the construction.

Fig. 4 is a plan view of the shutter winding assembly.

Fig. 5 is a section on the line 5—5 of Figure 4.

Fig. 7 is a sectional view showing the construction of the retarding mechanism.

Fig. 8 is a distended view of part of the retarding mechanism.

Fig. 11 is a detail of the firing pin interlock mechanism.

Fig. 12 is a detail of the shutter pinion interlock mechanism.

Figure 2:
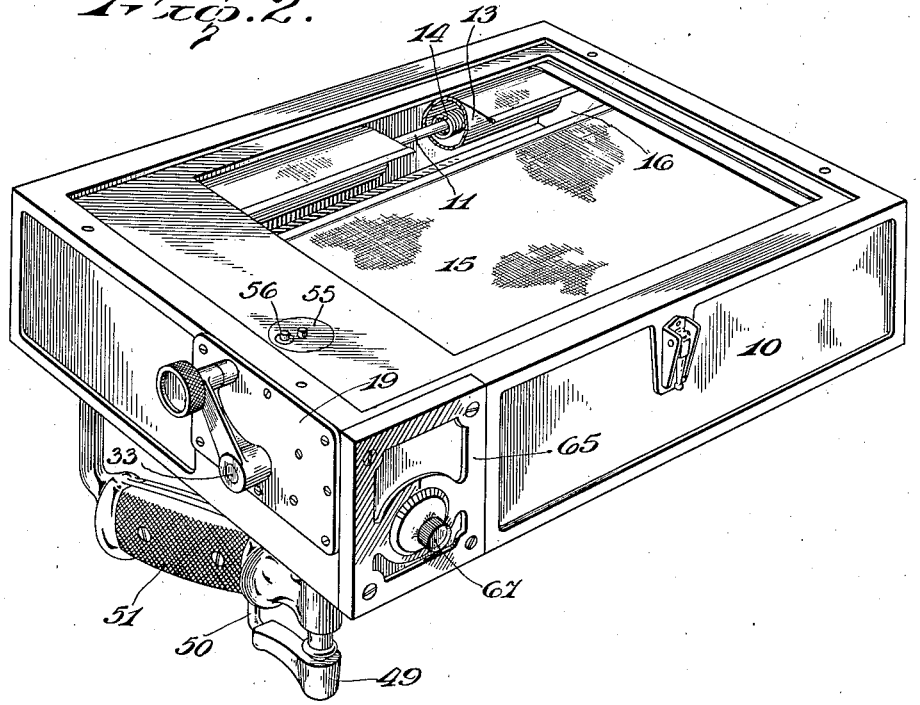
Fig. 2 is a perspective view of the body or shutter section of the camera shown in Figure 1 with parts broken away.

Referring to the drawings, I have shown in Figures 1 and 2 views of the shutter section of an aerial focal plane shutter camera. This section comprises a rectangular casing 10 to the upper side of which the customary film magazine A may be detachably connected and to the lower side the cone B supporting the lens. At two opposite sides of the casing 10 and near the upper side thereof are mounted on suitable rods 11 the shutter apron spools. The storage spool is designated 12 and the takeup spool 13, Figures 2 and 3. These spools are hollow and a driving spring 14 is mounted inside of each. One end of each spring is attached to the respective rod 11 and the other end to the respective spool.

The shutter apron 15 is attached to the spools 12 and 13 in any suitable manner and is provided with a single exposure aperture or slot 16, Figure 2. The purpose of the spring 14 in the storage spool 12 is to assist in turning this spool as the spring 14 in the takeup spool 13 winds up the shutter apron in making an exposure. The tension of each spring 14 may be independently adjusted by rotating the respective rod 11. Any suitable means may be employed for this purpose.

Figure 3:
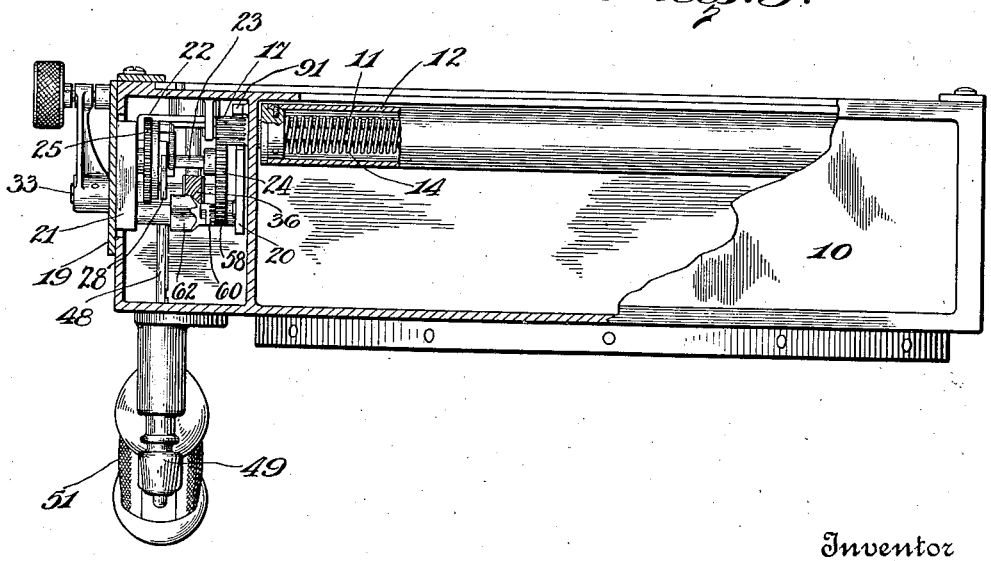
Fig. 3 is a side view of the body section shown in Figure 2 with parts broken away.

Since the spring 14 in the takeup spool can only drive said spool to take up the shutter apron as the apron unwinds from the storage spool 13, I associate the shutter release and controlling mechanism with the said storage spool only. To this end a pinion 17, Figure 3, is attached to one end of the storage spool 13. This pinion meshes with a gear 24, Figures 3 and 9, of the release and controlling mechanism which will presently be described in detail.

The construction and operation is much simplified by the use of only one exposure aperture in the shutter apron since this construction permits a short apron which not only reduces the weight but the liability to bind prevalent with the long shutter aprons usually employed. The short apron also reduces the cost of manufacture and assembly and permits the operating springs 14 to be designed for operation at a specific tension instead of at various tensions as is customary in shutters using different width slots in the shutter apron to obtain different length exposures.

The dividing of the work of operating the shutter between two springs, the one driving the takeup spool and the other the storage spool permits a rapid acceleration to the desired exposure speed. During an exposure the shutter apron is of course under a relatively small tension which is the difference in the tension of the two springs above mentioned. The wear on the apron is thus reduced and a smooth action secured. At all other times except during an exposure the apron is under the tension of the takeup spool drive spring and is therefore maintained taut and the shutter light-tight even under the most adverse handling.

We will now proceed to the description of the shutter release and controlling mechanism. This mechanism in the embodiment which I have illustrated is formed in two units, each mounted on a plate detachably secured to the casing 10, Figure 1. One of these units comprises the winding, releasing, winding control mechanism, and part of the retarding mechanism and is mounted on a plate designated 19 in the drawings. The other unit is mounted on a plate which I have designated as 65 and comprises the remainder of the retarding mechanism together with interlock parts which will be more fully described hereinafter.

The first mentioned unit comprises a frame having a back bearing plate 20 and a front bearing plate 21 spaced from the back bearing plate by spacing members 22, as shown in Figures 1, 2, 5 and 6. The front bearing plate is attached to the plate 19 and the unit is removable from the camera together with the said plate 19, as shown in Figure 1.

Mounted in suitable bearings in the front and back bearing plates is a shaft 23, Figures 3 and 4, having a gear 24 fixed thereto near the back bearing plate 20. This gear 24, as hereinafter stated, meshes with the pinion 17 fixed to the shutter apron storage spool 12. Near the front bearing plate a winding gear 25 is loosely mounted on the shaft 23. The gear 25 is adapted to turn the shaft 23 in one direction only thru a ratchet connection, shown in Figure 6, comprising a member 26 fixed to the shaft 23 adjacent the back face of the gear 25, and provided with a stop shoulder 27 normally engaging a dog 28 mounted by a pin or screw on the gear 25 and urged into engagement with the member 26 by a spring 30 attached at one end to the dog 28 and at the other end to a pin 31 projecting rearwardly from the gear 25. The dog 28 is provided with a tail 32 for the purpose of raising the dog 28 out of engagement with the shoulder 27 on the member 26 in releasing the shutter which action will be more fully described in connection with the shutter release trigger mechanism.

Figure 6:
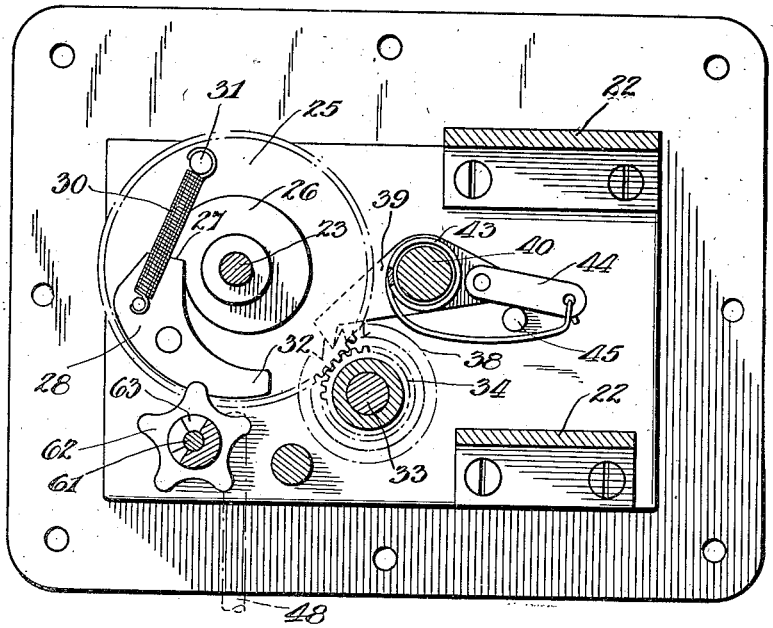
Fig. 6 is a section on the line 6—6 of Figure 4.

A main winding shaft 33, Figure 4, is mounted in suitable bearings in the front and back bearings plates. A pinion 34, Figure 6, is fixed to the shaft 33 and meshes with the gear 25 loosely mounted on shaft 23. A worm 36, Figure 4, and a cam 37 Figure 5 are also secured to the shaft 33 for purposes which will presently be described. A ratchet wheel 38, Figure 6, is fixed to the shaft 33 and a spring urged dog 39 cooperating therewith is loosely pivoted on a cross shaft 40 mounted in the front and back bearing plates. The shaft 40 extends thru the rear bearing plate 20 and an arm 40' is fixed to the extending portion, as shown in Figure 4. This arm 40' operates a consecutive number counter as the shutter is rewound thus registering the number of operations of the shutter. The shaft 33 extends thru the front bearing plate 21 and also the plate 19 to the outside of the camera, where a winding handle is attached thereto, as shown in Figures 2 and 3. The dog 39 and ratchet wheel 38 permit the shaft 33 to be turned in one direction only by the handle and prevent rotation of said shaft in the other direction.

The direction of rotation of the shaft 33 permitted by the ratchet dog 39 and ratchet wheel 38 is such as to turn the gear 25 thru pinion 34 in the direction to transmit rotation to the shaft 23 thru dog 28 and member 26. The rotation of the shaft 23 will be transmitted thru gear 24 to pinion 17 on the shutter apron storage spool 12, thus rotating the spool and winding up thereon the shutter apron and at the same time tensions the storage spool driving spring 14. As the shutter apron is rewound onto the storage spool 12 after an exposure it will of course reversely rotate the takeup spool 13 thus tensioning the takeup spool driving spring 14.

The gear 24 and pinion 17 are so designed that one revolution of the gear 24 is sufficient to rewind the shutter apron. The gear 24 will therefore make one revolution in the reverse direction during an exposure.

A one revolution mechanism, as shown in Figure 5, is provided to control the rotation of the gear 24 during an exposure and comprises a pin 41 projecting from the rear face of the gear 24 and a member 42 fixed to the cross shaft 40. The member 42 is provided with a cam surface 45, Figure 5, which when the shutter is in wound up or in set condition rests on the pin 41. When the shutter is tripped to make an exposure the gear 24 will be rotated carrying the pin 41 away from the cam surface 45 thus permitting the spring 43 to move the member 42 to bring a hook 46 formed therein in position to engage the pin 41 and stop the gear 24 at the completion of one revolution thereof. The helical spring 43 is mounted on the shaft 40 and is attached at one end to the said shaft 40 and at the other to the outer end of a link 44 pivoted at its inner end on the dog 39 and bearing at a point near the center of its length on a pin 45 projecting from the front bearing plate 21. The spring 43 is tensioned to bias the shaft 40 and member 42 fixed thereto in the direction of the shaft 23 and to pivot the link 44 about the pin 45 thus urging the dog 39 against the ratchet wheel 38. The purpose of the link 44 is merely to reverse the direction of bias since both the dog 39 and the member 42 must be biased in the same direction around the cross shaft 40.

To prevent the gear being rotated more than one revolution in winding the shutter back onto the storage spool 12 I have provided a downwardly projecting extension on the member 42 which, when the pin 41 raises said member 42 to normal upon completing one revolution of rewinding motion, is moved into the path of and engages a shoulder on the cam 37 fixed to the main winding shaft 33 thus preventing further winding of the shutter apron, as shown in Figure 5.

The tripping or release of the shutter is accomplished by pressing inward on the tail of the dog 28, Figure 6, thereby moving the dog out of engagement with the shoulder 27 on the member 26 thus freeing the shutter apron to the action of the springs 14.

While I have illustrated a trigger combined with a hand grip for the purpose of pressing in the tail of the dog 28, it is obvious that other forms of tripping means could be substituted if found desirable to adapt the camera for various mountings and uses.

In the form I have illustrated in Figures 1 and 3, I provide a trigger comprising a firing pin 48 which may be made in one or several parts as desired. To the outer end of the said firing pin a finger piece 49 is attached. This finger piece is guided by a rod 50 fixed thereto and parallel to the firing pin 48 and slidably fitting in a hole in the hand grip 51. The inward movement of the firing pin 48 to trip the dog 28 is limited by any suitable means. The firing pin 48 may also be biased to its outer position by any suitable means. If desired the trigger mechanism may operate the customary lens mask but as this does not form a part of the present invention it has been omitted from the drawings to more clearly illustrate my invention.

Figure 10:
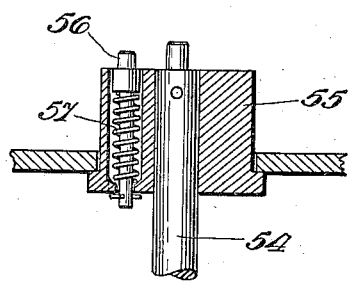
Fig. 10 is a section on the line 10—10 of Figure 5.

At the same time that the shutter apron is rewound the film magazine is operated to bring an unexposed section of film to exposure position. The drive for this purpose constitutes a worm wheel 53 fixed to a shaft 54 and meshing with the worm 36 on the main winding shaft 33 which is turned by handle 40 in rewinding the shutter apron, Figures 4 and 5. This shaft 54 is mounted in suitable bearings in the front and back bearing plate spacing members 22, Figure 5, and projecting at the upper end slightly above the level of the magazine seat on the top of casing 10 where it is reduced in size and serves as a centering pin for the magazine clutch member. The magazine clutch, as shown in Figures 10 and 2, comprises a cylindrical member 55 fixed to the shaft 54 and flush at its upper end with the magazine seat at the top of the casing 10. An engaging pin 56 is mounted in the upper face of the cylindrical member 55 and near the periphery thereof and is adapted to engage a recess in the cooperating magazine clutch member not shown. In order to obviate the necessity of alining the pin 56 with the recess in the portion of the clutch carried by the magazine when changing magazines I have slidably mounted the pin 56 in a recess in the cylindrical member 55 and have provided a spring 57 normally urging said pin outwardly but permitting the said pin to recede flush with the end of the cylindrical member in case of non-alinement with the recess in the co-operating clutch member carried by the magazine in changing magazines. During the first winding operation the pin 56 will snap into said recess under the action of its spring 57 thus coupling the winding mechanism to the magazine mechanism.

I will now describe the means which I employ to control the speed of the shutter apron during an exposure.

Figure 9:
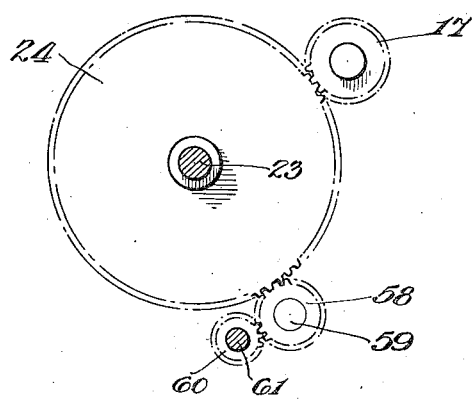
Fig. 9 is a diagrammatic view showing the relative cooperation of the shutter pinion, the winding gear and the retarder gear train.

Meshing with the gear 24 of the shutter apron control is a pinion 58, Figures 5 and 9, loosely mounted on a stud 59, Figure 5, extending from the bearing plate 20. This pinion also meshes with a pinion 60 loosely mounted on a shaft 61 extending between the front and back bearing plates. A pallet wheel 62, Figures 3 and 7, is also loosely mounted on the shaft 61 and is driven from the pinion 60 by a lost motion tongue and recess connection 63. The pallet wheel and pinion may be kept in abutting relation by any suitable means as by a shoulder on the shaft 61. While I have illustrated a five tooth pallet wheel it is to be understood that any desired number of teeth may be used.

Cooperating with the pallet wheel 62 is a series of pallet members 64, Figures 1 and 7, adjustably mounted from the hereinafter mentioned plate 65 in the following manner. A short shaft 66, Figures 7 and 8, is mounted to extend thru the plate 65, and on the outside of said plate is provided with an adjusting knob 67 having an index dial. On the inside of the plate 65 a disk 69 is fixed to the shaft 66. A channel shaped member 70 is positioned with the back 71 of the channel lying against the face of the disk 69 and is held in this relative position by a cross rod 72 passing thru holes 73 in the legs of the channel shaped member and supported in lugs 75 extending from the plate 65. The channel member 70 is free to slide on the cross rod 72 but is held from other movement relative thereto by the fact that the back of the channel abuts against the disk 69.

A slot 76 is provided in the back 71 of the channel shaped member and extends longitudinally thereof. Thru this slot extends a pin 77 fixed to the disk 69 and eccentrically to the shaft 66. A suitable bearing block 78 is loosely mounted on the pin 77 and in the slot 76. The bearing block is held in place by any suitable means as by a washer 79 and pin 80, Figure 7. Turning of the adjusting knob 67 will rotate the shaft 66, disk 69 and pin 77 which by virtue of its cooperation with the slot 76 in the channel member 70 will displace said member along the cross rod 72.

Shafts 81, Figure 7, are mounted between the legs 74 of the channel member 70, one on each side of the cross rod 72 and substantially equally spaced therefrom. Upon each of these shafts 81 a series of friction pallets 64, Figures 1 and 7, is mounted. Spacing washers 82 are provided between the pallets on each shaft. The spacing washers and the pallets are so arranged that the pallets on the one shaft are opposite the spacing washers 82 on the other shaft. As shown in Figure 7 the pallets 64 when assembled upon the shafts 81 are in interspersed overlapping relation. A spring 83', Figure 8, may be provided on one or both shafts 81 to hold the assembled pallets in frictional relation.

Each pallet 64, Figure 8, is constructed with diverging legs 83, each leg having an inwardly projecting interfering nose 84. These noses 84 cooperate with the teeth on the pallet wheel 62. The distance between the interfering noses 84 and the positioning of the shaft 81 upon which the pallet is mounted is such that, as one nose 84 of a given pallet rests on the crest of a tooth of the pallet wheel 62 the other nose of this pallet lies in the space between two teeth of the pallet wheel.

The pallets 64 on the two shafts 81 when assembled in the channel member 70 are, as has been hereinbefore described, in overlapping interspersed relation. The positioning of the shafts 81 is also such that as a nose 84 of one pallet rests on the crest of a tooth of the pallet wheel the opposite nose 84 of the adjacent pallet mounted on the other shaft 81 also rests on the crest of a pallet wheel tooth.

By thus mounting the pallets a smooth balanced reaction is obtained as the pallets on the two shafts 81 are moved simultaneously in opposite directions by the pallet wheel. This also increases the relative frictional movement between the pallets thus reducing the number of pallets necessary for a given braking action.

The lost motion connection 63, Figures 3 and 4, between the pallet wheel 62 and its drive pinion 60 permits the pallet wheel to center itself with respect to the pallets 64 when not in motion and also allows the pinion 60 to pick up speed before taking the load of the pallet resistance thus reducing the liability to strip the pinion teeth.

The pallets 64 are rocked back and forth as the pallet wheel 62 rotates and the friction resistance to this rocking together with the inertia resistance thereto retards the rotation of the pallet wheel 62 to a uniform speed. The pallet wheel 62 as has been described is connected thru a train of gears to the shutter apron storage spool 13 and therefore maintains said spool and the shutter at a uniform speed throughout an exposure.

I have found that at times it is desirable under certain circumstances to make some of the pallets 64 heavier and therefore of greater inertia braking effect than others and desire it to be understood that this construction comes within the scope of my present invention.

Each pallet 64 is provided as shown in Figure 7 with a tail or dog 64$^a$ which when the pallets are assembled on their shafts 81 in the channel member 70 lies below the cross rod 72 thus preventing the pallets 64 from swinging outward around the shafts 81. The inward swinging of the pallets 64 is prevented by the spacer washer of the opposite shaft 81. Sufficient play is of course allowed to permit the pallets 64 to rock under the action of the pallet wheel 62. This construction permits the ready removal and replacement of the retarder unit.

The pallets 64 may be adjusted as a unit longitudinally of the pallet wheel 62 by moving the channel member 70 upon which the pallets are mounted along the cross rod 72. This is accomplished by turning the knob 67 as hereinbefore described. This longitudinal adjustment of the pallets is for the purpose of carrying more or less of the pallets beyond the end of the pallet wheel 62 to an ineffective positon thus altering the braking action on said pallet wheel. This will of course change the speed of the shutter apron. The speed of the apron will however be maintained uniform at the adjusted speed since some of the pallets are always in effective braking position.

The index dial 68 may be graduated to indicate the shutter speed at desired settings on the dial. Suitable means may also be provided for holding the knob 67 and the index dial 68 in these various positions.

In order to prevent tripping of the shutter when the retarding pallet unit is removed from the camera, I have provided an interlock, as shown in Figure 11, between the plate 65 carrying the pallets 64 and the trigger firing pin 48. This interlock comprises a L-shaped member 85 pivoted by a stud 86 to the casing 10 adjacent the firing pin 48. The firing pin is provided with a notch 87, Figures 3 and 11, with which the L-shaped member 85 is adapted to cooperate when the plate 65 is removed from the camera thus preventing inward movement of the firing pin 48 and therefore preventing tripping of the shutter thereby.

The plate 65 is formed with a cam 88 which when the plate is in position on the camera engages one arm of the L-shaped member 85 rocking the member about its pivot stud 86 and carrying the member out of engagement with the firing pin 48. The L-shaped member 85 is biased against the action of the cam 88 by a spring 89 attached at one end to the L-shaped member and at the other to a stud 90 fixed to the casing 10.

I have also provided an interlock between the retarding unit and the shutter storage spool 13 to prevent rotation of said spool when the retarding unit is removed from the camera. This interlock, as shown in Figure 12, comprises a member 91 pivoted on the casing 10 by a stud 92 and biased by a spring 93 to engage the pinion 17 on the shutter apron storage spool 13. The plate 65 of the retarding unit is formed with an abutment 94 which when the retarding unit is in place on the camera engages the pivoted member 91 and carries the same out of engagement with the pinion 17. This interlock, if found desirable, may be operated from the winding mechanism unit mounted on the plate 19 in which case the shutter storage spool will be locked against rotation when the winding mechanism unit is removed from the camera.

This interlock not only prevents release of the shutter at all times when the retarding mechanism is ineffective but also permits the removal of the winding and retarding units from the camera without disturbing the tension in the springs 14 and therefore the timing of the shutter.

Figure 15:
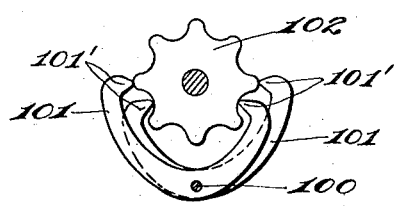
Fig. 15 is a detail view of another modified form of braking device.

In Figure 15 I have shown a modified pallet retarding device in which the pallets are mounted on a single shaft 100. I have designated the pallets as 101 and the pallet wheel as 102. A pallet wheel having an even number of teeth is illustrated in connection with this modification but this is not essential as an odd number will operate equally as well. The legs of the pallets 101 are of unequal length in order that the interfering noses 101' on the legs will be so positioned that as one nose rises to the crest of a tooth on the pallet wheel 102 the other nose of the pallet will enter the space between two teeth on said pallet wheel. The pallets 101 are assembled on the shaft 100 with the short legs of adjacent pallets on opposite sides of the pallet wheel 102 and if desired may be pressed together by a spring. The cooperation between the pallets 101 and the pallet wheel 102 is such that adjacent pallets are moved simultaneously in opposite direction by rotation of the pallet wheel 102, thus securing a smooth balanced action and increased frictional movement between the pallets.

Figure 16:
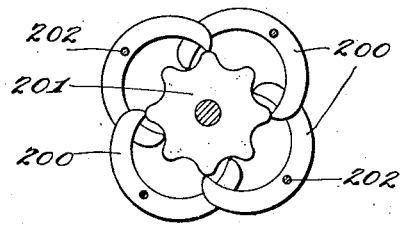
Fig. 16 is a detail view of another modified form of braking device.

In Figure 16 I have shown another modification of retarding device in which I have illustrated pallets 200 cooperating with a pallet wheel 201 and mounted on a series of shafts 202 arranged at intervals around the pallet wheel. The number of shafts 202 and the size of the pallets 200 is such that the pallet or pallets on each shaft 202 overlie the pallet or pallets on the two adjacent shafts 202. The pallets are also so designed that the overlapping ends of adjacent pallets will be simultaneously moved in opposite directions by the teeth of the pallet wheel 201. A single pallet or a plurality of pallets spaced by washers may be assembled on each shaft 202. If desired a spring may be provided on each shaft or on as many shafts 202 as desired for pressing the pallets into frictional relation with the pallets on the adjacent shafts 202.

While vibration is reduced to a minimum by providing pallet assemblies throughout the circumference of the pallet wheel it is obvious that if found expedient the pallet assemblies could be confined to but a portion of the circumference.

I have not illustrated adjusting devices for varying the cooperation of the pallets with the pallet wheel in this or the preceding modification but it is to be understood that the pallets in these modifications may be adjusted relative to the pallet wheel in a manner similar to that illustrated in connection with the first embodiment or by any suitable means.

It is also to be understood that the weight of the various pallets may also be varied as described in connection with the first embodiment.

Figure 13:
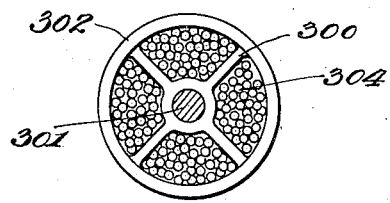
Fig. 13 is a detail view of a modified form of braking device.
Figure 14:
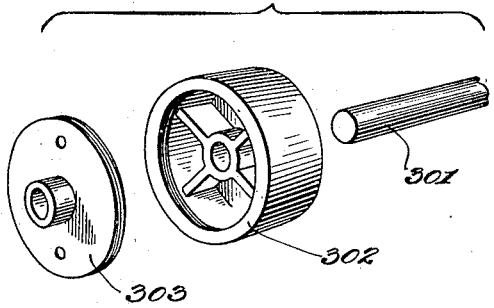
Fig. 14 is a distended view of the modified form shown in Figure 13.

In Figures 13 and 14 I have disclosed a modified form of braking device which may be attached directly to the shutter storage spool or to a shaft driven therefrom as in the case of the pallet brake hereinbefore described. This modification comprises a vane or paddle wheel 300 driven directly from the shutter storage spool or fixed to a shaft 301 driven thereby. This paddle wheel 300 is encased in a cylindrical housing 302 fixed relative to the casing 10 and closed at both ends except for apertures for the shaft 301. The closure for one end of the housing 302 is in the form of a threaded plug or disk 303. The interior of the casing is filled with spherical balls or shot 304 which by their friction with the housing 302 and each other, impede the turning of the paddle wheel thus producing a braking action on the paddle wheel shaft 301 and therethru upon the shutter storage spool. The amount of this braking action can be adjusted by screwing the disk 303 in or out thus varying the friction produced by the balls 304. Any suitable means may be provided for turning the disk 303 from the outside of the camera.

Figure 17:
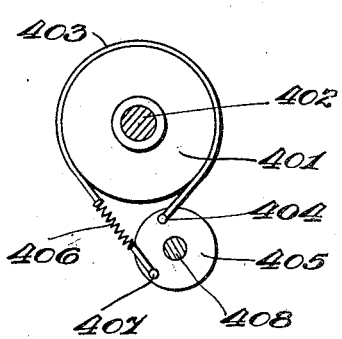
Fig. 17 is a detail view of another modified form of braking device.

In Figure 17 I have shown a modified form of brake in which I employ a drum 401 mounted on the storage spool 13 on a shaft 402 rotated thereby. I have provided a brake band 403 cooperating with the drum 401 for controlling the speed of rotation thereof and thus the speed of the shutter. The braking effect of the band 403 on the drum 401 may be varied by any suitable means. For this purpose I have shown one end of the band 403 directly attached to a pin 404 eccentrically mounted on a disk 405. The other end of the band 403 is shown as attached thru spring 406 to a pin 407 also eccentrically mounted on the disk 405. The disk 405 is concentrically mounted on and fixed to a shaft 408 projecting to the outside of the camera where it is provided with a usual adjusting knob and index dial, not shown.

This braking action is sufficient at all times to retard the shutter to a uniform speed during an exposure. The rate of the uniform speed is adjustable by turning the adjusting knob thus varying the retarding action of the brake band 403 on the drum 401. Suitable means are provided for holding the adjusting knob in various positions of adjustment but are not shown in the drawings.

Figure 18:
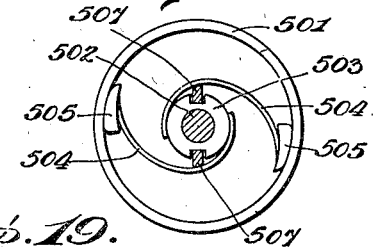
Figs. 18 and 19 are details of another modified form of braking device.
Figure 19:
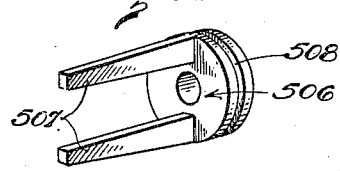

In Figures 18 and 19 I have disclosed a modified form of braking device which may be attached directly to the shutter storage spool or to a shaft driven therefrom as in the case of the modifications described above. This braking device consists of a drum 501 fixed to the camera body and concentric to a shaft 502 driven from the shutter storage spool. On the shaft 502 and within the drum 501 a hub member 503 is secured in any suitable manner. Spring brake arms 504 are fixed at their inner ends to the hub 503 and at their outer ends carry brake shoes 505. The brake shoes 505 are held against the drum 501 by the tension of the springs 504. Rotation of the shaft 502 by the shutter storage spool will be retarded by the braking action of the shoes 505 and maintained at a uniform speed.

In order to produce exposures of various duration, it is necessary to produce various uniform speeds. I accomplish this by varying the tension of the springs 504. To this end I provided a member 506 having tapered projections 507 one for each spring 505.

The member 506 is loosely mounted on the shaft 502 with a projection 507 adjacent each spring 504 and between said spring and the hub 503. Slots are formed in the hub 503 to receive the projections 507 and hold the same in fixed radial relation to the springs.

By moving the member 506 along the shaft 502 toward the hub 503 the tapered projections 507 will raise the springs from the hub producing greater tension on and braking action by the brake shoes 505, thus producing various speeds of uniform motion. By moving the member 506 away from the hub 503 the tension of the springs 504 will of course be reduced and the braking action lessened. There will, however, at all times be sufficient braking action to cause a uniform speed of motion.

In Figure 19, I have shown a groove 508 in the member 506 which may be engaged by any suitable means for adjusting the member 506 along the shaft 502 to or from the hub 503 from the outside of the camera. This means may also be provided with graduation indicating settings for desired speed of uniform motion.

The brake shoes may be weighted if an inertia braking action is desired in addition to the spring action. The inertia braking of course is independent of the spring braking action and will not be varied by variations in the tension of the springs 504.

In compliance with the patent statues I have illustrated and described preferred forms of embodiment of my invention, but it is to be understood that various modifications and changes could be made therefrom without departing from the spirit of the invention or the scope of the appended claims.

What I claim my invention is:

1. In combination with a focal-plane shutter, means to produce uniform motion of said shutter throughout an exposure.

2. In combination with a focal-plane shutter, means to produce uniform motion of said shutter throughout an exposure, and means to vary the first named means to produce exposures of different duration.

3. In combination with a focal-plane shutter, means for driving said shutter, means to produce uniform motion of said shutter throughout an exposure, and a lost motion connection between the shutter driving means and the uniform motion producing means.

4. In combination with a focal-plane shutter, a storage spool for said shutter, means for driving said shutter, and means separate from said driving means for assisting the unwinding of said shutter from the storage spool during an exposure.

5. In combination with a focal-plane shutter, means for driving said shutter, means normally locking said driving means, means for releasing said locking means, means to produce uniform motion of said shutter driving means throughout an exposure, and an interlock between the releasing means and the uniform motion producing means to prevent the operation of the releasing means when the uniform motion means is ineffective.

6. In combination with a focal-plane shutter, means for driving said shutter, means normally locking said driving means, means for releasing said locking means, means to produce uniform motion of said shutter driving means throughout an exposure, and means for preventing the operation of the releasing means when the uniform motion means is ineffective.

7. In combination with a focal-plane shutter, means to produce uniform motion of said shutter throughout an exposure, and means to adjust the speed of such uniform motion.

8. In combination with a focal-plane shutter, means for driving said shutter, and a combined inertia and friction braking means for controlling the driving of said shutter.

9. In combination with a focal-plane shutter, means for driving said shutter, and a combined inertia and friction braking means for controlling the driving of said shutter, said last named means comprising a series of pallets and a cooperative pallet wheel, the latter being driven from the shutter driving means.

10. In combination with a focal-plane shutter, means for driving said shutter, and an inertia means for controlling the driving of said shutter.

11. In combination with a focal-plane shutter, means to drive said shutter, means to control the driving means, and a lost motion connection between the first named means and the last named means.

12. In combination with a focal-plane shutter, means for driving said shutter, a pallet wheel driven by said shutter, and a combined inertia and friction braking means for controlling the driving of said shutter, said last named means comprising a series of pallets cooperating with said pallet wheel, and means to adjust said pallets relative to said pallet wheel to vary the braking action.

13. In combination with a focal-plane shutter, means for driving said shutter, and a combined inertia and friction braking means for controlling the driving of said shutter, said last named means comprising a series of pallets mounted in interdispersed overlapping relation from two parallel shafts, and a cooperative pallet wheel, the latter being driven from the shutter driving means.

14. In combination with a focal-plane shutter, a storage spool for said shutter, spring means for driving said shutter, and spring means separate from said means for turning the storage spool during an exposure.

15. In combination with a focal-plane shutter apron, a storage spool for said shutter apron, spring means for driving said shutter apron and spring means separate from and of less tension than said spring driving means for turning the storage spool during an exposure.

16. In combination with a focal-plane shutter apron, a hollow takeup spool connected to one end of said apron, a hollow storage spool connected to the other end of said apron, a driving spring within the takeup spool and connected to turn said spool to take up the shutter apron, and a spring of less tension within the storage spool and connected to turn said spool to play out said shutter apron.

17. In combination with a focal-plane shutter apron, a hollow takeup spool connected to one end of said apron, a hollow storage spool connected to the other end of said apron, a driving spring within the takeup spool and connected to turn said spool to take up the shutter apron, and a spring of less tension within the storage spool and connected to turn said spool to play out said shutter apron, and releasable means to prevent turning of the storage spool.

18. In a focal-plane shutter camera, a shutter apron, means for driving said shutter apron, means for winding said shutter apron and controlling said driving means, and an interlock to prevent driving of said shutter apron when the winding and controlling means is removed from the camera.

19. In a focal-plane shutter, means for driving said shutter, means for controlling said driving means, and means for locking said driving means when said controlling means is ineffective.

20. In combination with a focal-plane shutter, retarding mechanism therefore comprising a pallet wheel driven from said shutter, and a plurality of series of pallets cooperating with said pallet wheel and mounted in overlapping relation to each other.

21. In combination with a focal-plane shutter, retarding means therefore comprising a pallet wheel driven from said shutter, and a plurality of series of pallets cooperating with said pallet wheel and mounted in overlapping frictional relation to each other.

22. A device of the class described comprising a shutter, a pallet wheel driven from said shutter, a shaft, and a series of pallets mounted on said shaft and cooperating with said pallet wheel, opposite legs of adjacent pallets rising simultaneously to the crest of pallet wheel teeth.

In testimony whereof I affix my signature.

SHERMAN M. FAIRCHILD.